United States Patent [19]
Ehnert et al.

[11] Patent Number: 4,969,971
[45] Date of Patent: Nov. 13, 1990

[54] APPARATUS FOR PRODUCING FIBRE-REINFORCED THERMOPLASTIC MATERIAL FOR THE PRODUCTION MOULDINGS

[75] Inventors: Gerd Ehnert, Graben-Neudorf; Rolf von Paumgartten, Wiesloch, both of Fed. Rep. of Germany

[73] Assignee: Menzolit GmbH, Kraichtal-Menzigen, Fed. Rep. of Germany

[21] Appl. No.: 296,023

[22] Filed: Jan. 12, 1989

Related U.S. Application Data

[62] Division of Ser. No. 154,320, Feb. 10, 1988, abandoned.

[30] Foreign Application Priority Data

Feb. 10, 1987 [DE] Fed. Rep. of Germany ....... 3704037
Aug. 13, 1987 [DE] Fed. Rep. of Germany ....... 3726922

[51] Int. Cl.$^5$ ............................................. B29C 43/22
[52] U.S. Cl. .................... 156/500; 156/501; 425/110; 425/378.1; 425/404; 425/406; 425/407

[58] Field of Search ...................... 156/500, 501, 62.2; 425/72.1, 85, 110, 112, 378.1, 404, 406, 407, 411, 461; 264/131, 174, 349

[56] References Cited

U.S. PATENT DOCUMENTS

| | | | |
|---|---|---|---|
| 1,054,464 | 2/1913 | Soucek | 425/378.1 |
| 1,890,802 | 12/1932 | Apple | 425/378.1 |
| 2,143,549 | 1/1939 | Edmonds | 425/378.1 |
| 3,327,345 | 6/1967 | Bullough et al. | 425/407 |

FOREIGN PATENT DOCUMENTS 937197 6/1982 U.S.S.R. ............. 425/378.1

*Primary Examiner*—Caleb Weston
*Attorney, Agent, or Firm*—Antonelli, Terry, Stout & Kraus

[57] ABSTRACT

An apparatus for producing batches of a mouldable, fibre-reinforced thermoplastic material matched to a moulding to be produced and accompanied by heating, wherein an initial product of fibres and thermoplastic material-containing binder is heated as a strand and a matched batch is separated from the strand and supplied for batch further processing. The apparatus includes a melting device with a melting channel, through which is forced the material to be processed in the form of a continuous strand, as well as a dosing station.

23 Claims, 3 Drawing Sheets

APPARATUS FOR PRODUCING FIBRE-REINFORCED THERMOPLASTIC MATERIAL FOR THE PRODUCTION MOULDINGS

This is a division of application Ser. No. 07/154,320, filed Feb. 10, 1988 now abandoned.

BACKGROUND OF THE INVENTION

The invention relates to an apparatus for producing batches of a mouldable, fibre-reinforced thermoplastic material matched to the mouldings to be manufactured, accompanied by heating.

The reinforcing fibres are in particular constituted by cut glass fibres, but it is also possible to use other mineral, inorganic or miscellaneous synthetic fibres, such as carbon, aramide or polyester fibres. When reference is made hereinafter to glass fibres, the latter can be replaced by the aforementioned fibres. Cut glass fibres are used in large quantities for the production of fibreglass-reinforced plastic parts. The glass fibres are bound by a binder, which has as the main component or matrix a thermoplastic material, such as polypropylene and in addition can contain carbonblack, wax and other additives. In one form, the production of a semifinished product in a press to give a moulding takes place by strewing the fibres to form a fleece and impregnating the same with liquid synthetic resin. In another form, the fibres are processed in the liquid phase to a suspension or slurry, which is processed by stirring or mixing movements to give a tangled fibrous material. Here again, use is made of liquid synthetic resins or pulverulent binders in conjunction with an aqueous suspension. In the latter case, the suspension is dried after forming a tangled fibre fleece. In both case the thickness and width of the fleece must be adapted to the mouldings to be moulded, the former being necessary and the latter in order to avoid excessive waste. The fleece must subsequently be cut into individual plates adapting to the mouldings to be produced.

It has also been proposed (German patent application No. P 36 04 888.7) to add liquid wetting agents with a maximum proportion of 20% by weight, so as to obtain a moist, but still free-flowing material, which as an intermediate product is packed in plastic bags and transferred to the further processing enterprise or can also be processed in a heated belt press to preshaped plate material.

In particular, the first-mentioned processes are very complicated and involve high costs. In all the aforementioned processes the preparation and compounding of the semifinished product is necessary, which makes the process inflexible and prevents or makes much more difficult adaptations to other mouldings.

It has also already been proposed to whirl glassfibre bundles together with the thermoplastic material-containing binders in a whirling or turbulence chamber to a cottonwool or wadding-like felt and subsequently either to pack under a vacuum, preferably in plastic bags made from a material compatible with the thermoplastic material of the binder and in particular the same material, or to make same directly available for further processing (German patent application No. P 37 04 035.9).

The problem of the present invention is to provide a process and an apparatus, which does not presuppose the preparation and compounding of the starting material as a function of the mouldings to be produced and which is in particular suitable for further processing of the starting material produced according to the aforementioned process, but also for processing unmatched intermediate products.

According to the invention an initial product of fibres and thermoplastic material-containing binder is heated as a strand and a matched batch is separated from the strand and supplied for batched further processing. The inventive apparatus, particularly for performing the is characterized in that there is a melting device with a melting channel, through which the material to be processed is forced as a continuous strand, as well as a dosing station.

The apparatus of the present invention simplifies the production sequence, as well as permits a high level of automation during moulding production. No preparation and compounding of the starting product are required, so that costs can be kept low. Through the construction of the inventive apparatus as a closed system, it is possible to prevent decomposition of the thermoplastic matrix by overheating so that fire risks are reduced and it is less prejudicial to the environment. The inventive apparatus permits considerable variation possibilities regarding the use of higher-quality thermoplastics (e.g. PA and PTP), the use of different reinforcing fibres and a change to the batch volume for the moulding at the press, so that the inventive apparatus by means of the process for providing the charges can be used for several following, presses, which also differ as regards the charge quantity for different mouldings.

In particular, the starting material in free-flowing form can be supplied in a standard pack size, such as a vacuum bag, or a dimensionally stable, precompressed semifinished product and need not, as is necessary in the case of glass mat production, be adapted in accordance with special use weights, etc. to the mouldings. The dosing carried out at the end of the inventive process or on leaving the inventive apparatus can then be carried out precisely on the basis of the moulding to be produced and can be changed between individual batches, so that several presses, which produce different mouldings and also with different weights can directly follow one another and can be alternately supplied by the dosing station.

According to a preferred development of the invention, the initial product is precompressed and directly supplied to the continuous strand or the melting device has upstream thereof a compressing station with a common channel for the material to be processed. According to a further development the compressing station has a cooled compressing channel, to which is connected the melting channel of the melting device and at the end of the compressing channel remote from the transition point of compressing channel and melting channel is provided with a movably positioned compressing and feed plunger. In particular the melting channel of the melting device is surrounded by heating elements over its entire length. The dosing piston of the dosing device can simultaneously be the feed piston for passing the softened material through the melting device. According to a preferred development, vacuum is applied when compressing the starting material, so as to avoid air inclusion and the like. For this purpose and in particular in the vicinity of the compressing station, vacuum lines can be provided for applying the vacuum. According to a preferred development, the melting channel is provided over its entire length with heating elements. The material is heated in the melting channel to a temperature which is higher than the melting point of the thermoplastic material and is in particular 40° to 100° C. over the melting point. The inventive process permits a very high throughput of material to be softened and dosed, so that it is readily possible to achieve a throughput of 2 Kg or more per minute. If the heating channel has a considerable length, it is preferably laid in loops, so as to shorten the overall length of the apparatus.

In order to keep the actual heating channel surrounded by heating elements, e.g. electric heating coils, in which the material to be processed is kept pasty-liquid, as short as possible, according to a preferred development, the compressed initial product is heated over its entire volume by hot gas or at least the fibrous core region of the semifinished product is heated by hot gas. If free-flowing or pourable product is supplied, it is possible to have between the cooling station which prevents the material from sticking to the compressing plunger and the compressing chamber surrounded by the heating elements, a hot air station constructed in such a way that a corresponding channel area, through which the material is pressed is surrounded by a metal filter, which forms the wall of the area and through whose openings radially hot gas and in particular inert hot gas, such as nitrogen or helium, if the polymer is not attacked also hot air is forced through, which heats the material in said area over its entire cross-section and therefore volume to above the melting point of the polymer.

According to another development the precompressed, dimensionally stable semifinished product is supplied. In particular semifinished product with a rigid outer covering and an inner felt-like core of fibreglass—polymer—granular mixture can be supplied. The polymer can in particular be in dust or granule form. Such a dimensionally stable semifinished product can be produced by brief, very high heating of a covering area of felt-like starting material in the compressed state.

So that also in this case the melting chamber can be made relatively short, a hot air station is connected upstream of the melting channel. In this case, the hot air station is positioned in front of an inlet to the compressing and melting station. It can in particular have a temperature control chamber, which can preferably be bounded by two displaceable pistons, but also by other suitable devices, through which the dimensionally stable semifinished product is moved from a supply opening to a discharge opening to the compressing and melting station. Openings are provided in the two pistons through which hot air is blown axially into the area between the two pistons and through the felt-like core area of the semifinished product in order to heat the latter here to a temperature just below the melting point. At such a temperature the semifinished product is conveyed on to complete melting and dosing, as described hereinbefore. This also makes it possible to significantly shorten the melting channel surrounded by the heating elements.

Further advantages and features of the invention can be gathered from the claims and following description of an embodiment of the inventive apparatus for providing a matched quantity of a mouldable fibre-reinforced thermoplastic material with reference to the attached drawings, wherein show:

DETAILED DESCRIPTION

Figure 1:
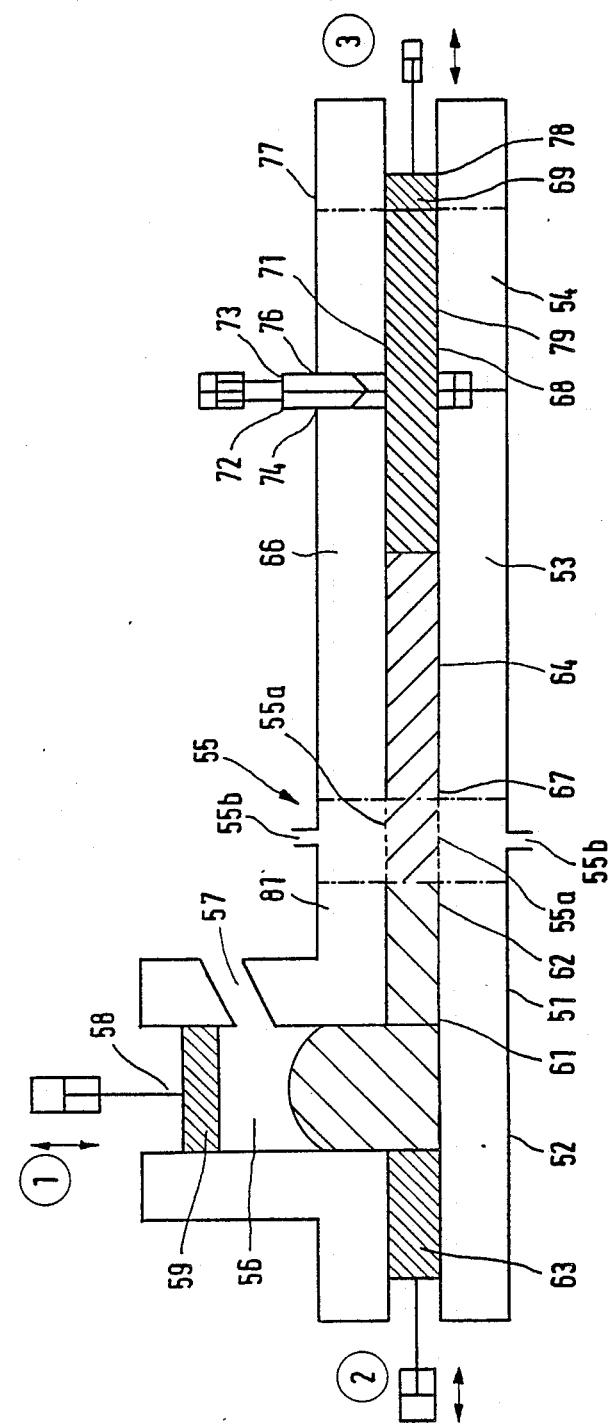
FIG. 1 is a diagrammatic view of a first embodiment of the inventive apparatus in side view.

The inventive apparatus 51 for providing a quantity of a mouldable, fibre-reinforced thermoplastic material matched to the moulding to be produced has a compressing station 52, a hot gas station 55, a melting channel 64 and a dosing station generally designated by the reference numeral 54. The compressing station 52 has a receiving and precompressing chamber 56 into which issues a supply duct 57 and which as a piston and cylinder unit 58 is provided with a precompressing piston 59. Piston 59 can be driven in an appropriate way, particularly hydraulically. In its end region 61 remote from piston 59, the supply and precompressing chamber 56 passes into a compressing chamber 62. The latter has a compressing and feed piston 63, which is also suitably operated and preferably hydraulically operated. Compressing chamber 62 is firstly provided with a cooling area 81, in which cooling elements are provided round the channel in order to prevent the material remaining there with the feed piston 63. In the embodiment according to FIG. 1, to cooling area 81 is connected a hot gas station 55, which has the chamber or channel-surrounding covering walls on a metal filter 55, as well as hot gas connections 55a. Thus, hot air can be blown radially through the compressed, filter-like material. As a result of this hot gas heating, it is possible to significantly shorten the length of the melting channel 54 surrounded by heating element 66. For heating purposes, use is more particularly made of inert gases such as nitrogen or helium, which are optionally blown in closed circuit through the material. In the case of non-problematical binders (including the thermoplastic materials contained), it is also possible to use hot air. Heating takes place preferably by means of the hot gas to above the melting point, e.g. 240° C.

To the channel-like compressing chamber 62 is connected a melting channel 64 of melting device 53. Melting channel 64 is surrounded by heating elements, by means of which the fibre-reinforced thermoplastic 67 therein is heated to the melting point.

To the melting device is connected dosing station 54, which has a dosing chamber 68, in which is movable a dosing and ejecting piston 69, which is also preferably hydraulically operated. The dosing and ejecting piston 69 acts against the compressing and feed piston 63. Melting device 53 and dosing station 54 are provided at their contact area 71 remote from piston 69 with separating devices 72, 73, which in each case preferably have hydraulically operated separating slides 74, 76. Separating device 72 is connected to a melting device 53, which is preferably stationary. Separating device 73 is connected to dosing station 54, whose area 71 facing the end of melting device 53 can be moved away from the latter, being preferably pivotably arranged about a vertical axis 77. Dosing station 54 also has heating devices 78 keeping the batch 79 of the fibre-reinforced thermoplastic material located therein in a suitable, even plastic state.

The semifinished product is supplied through supply duct 57, which can take place portionwise, in that a specific material quantity is introduced through duct 57 into precompressing chamber 56 and can be precompressed by the precompressing plunger 59. Upstream of supply duct 57 can be provided a bin, which contains the material to be processed, e.g. in pourable form. In this case there is also a blocking slide at the end of the supply duct. The material to be processed is a glass fibre-filled thermoplastic material, which is either pourable or is in the form of suitable portions. It can be produced in a substantially random manner, e.g. conventionally in that a fleece is impregnated with liquid synthetic resin or the fleece is produced through a suspension and drying. It can be a moist-packed, but still free-flowing material in plastic bags (German application No. P 36 04 888.7). It can be a wadding-like felt material produced by whirling fibres and thermoplastic material-containing binders which is directly supplied by the whirling chamber to the inventive apparatus, or which after packing is also made available in plastic bags. If the intermediate product is in plastic bags it can be supplied by pouring out of these after opening, such as cutting open. Preferably use is made of plastic bags of a material, which is compatible with the thermoplastic material of the binder and in particular is the same material. In this case, the material with the plastic bags can be directly supplied via supply duct 57 to the receiving and precompressing chamber 56.

After supplying into the receiving and precompressing chamber 56 the material, as stated, is precompressed by means of plunger 59 and forced into the compressing channel 62. Plunger 59 remains in its lower position, which closes with the upper boundary wall of channel 62. Piston 63 then takes over the main compression of the material, in that it moves in the direction of the melting channel and on the one hand further compresses the material and on the other moves the material into and through the melting channel 64. During this main compression vacuum is simultaneously applied to the compressing channel 62, in order to avoid air inclusions.

Simultaneously the material heated in melting channel 64 is introduced with the separating devices 72, 73 open into the empty dosing station 54, in which the dosing and ejecting piston 69 is displaced to the right with adjustable counterpressure until the desired volume quantity is present in the dosing station and which is required for producing a specific moulding. Separating slides 74, 76 are then moved and separate the material 79 in the dosing station from material 67 in melting device 53. In the dosing station 54 the viscous material 59 can be kept at a suitable higher temperature until required by the press for moulding a new moulding. In this case the dosing station 54 pivots sideways about axis 77. Separating slide 76 is opened again and piston 69 presses the volume-dosed mass 79 out to the left in the drawing, e.g. directly into the press or onto a means for receiving material 79. If the material is only viscoplastic, it can be taken up directly, e.g. by a robot arm. In the two last-mentioned cases the material is subsequently transferred to the press. In the press it can be further processed in known manner to a moulding.

The compressed moulding dosed in the dosing station 54 can be cooled and intermediately stored after ejection. In particular in this case it is ensured that the dosing chamber has a cross-section permitting the production of largely plate-like mouldings.

Figure 2:
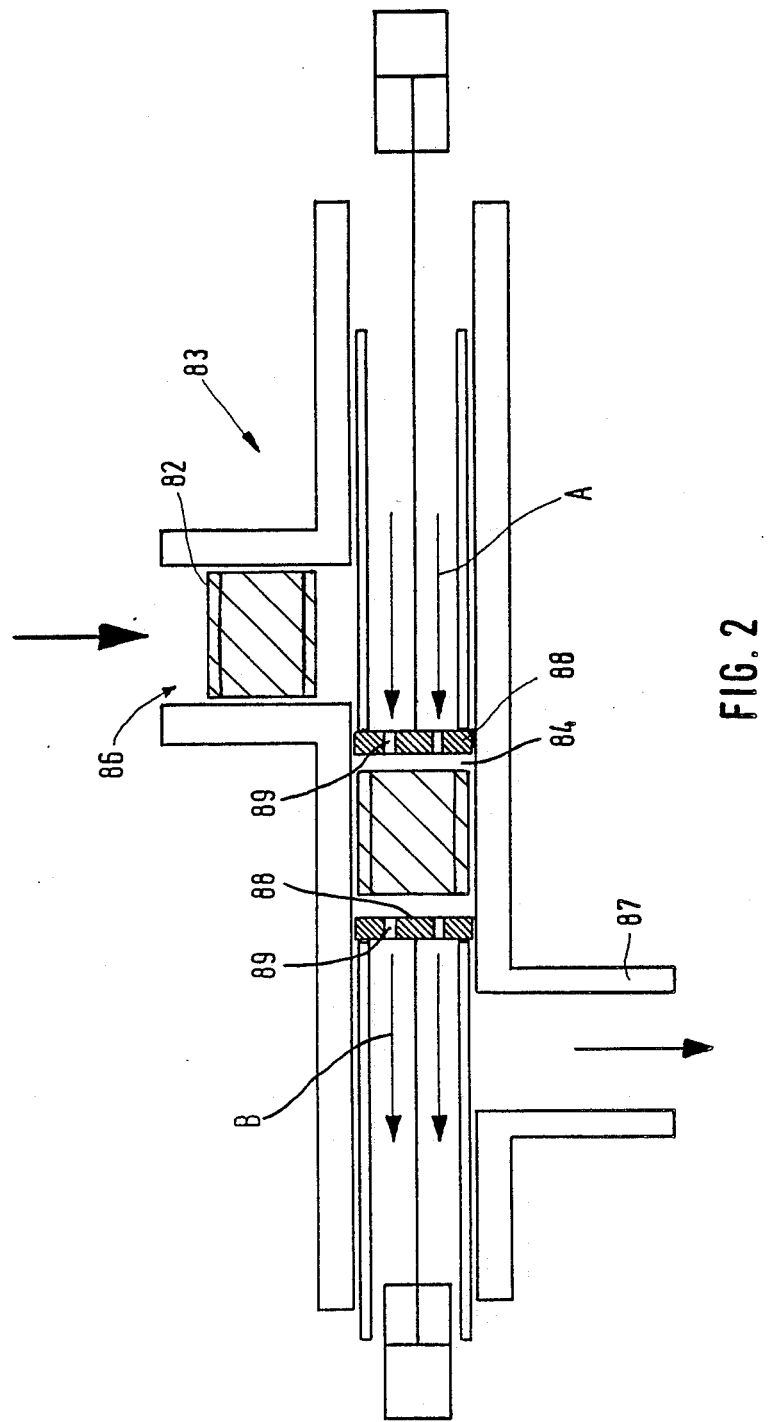
FIG. 2 is a temperature control device for dimensionally stable semi-finished product as part of a second embodiment of the inventive apparatus.
Figure 3:
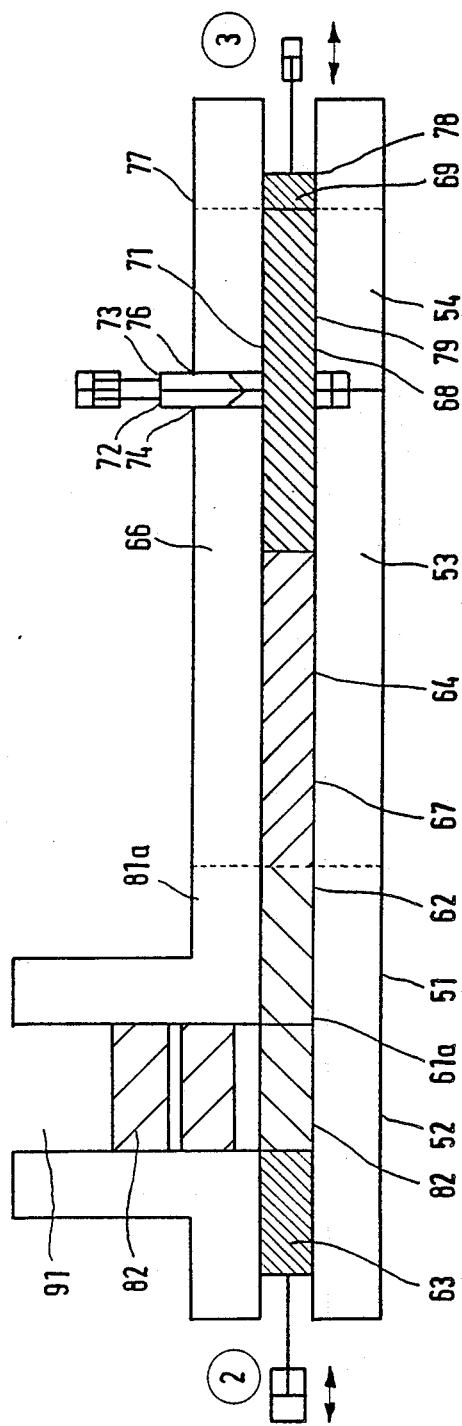
FIG. 3 is a side view of portions of a second embodiment of the inventive apparatus.

In the construction according to FIGS. 2 and 3 a dimensionally stable semifinished product is supplied in the form of e.g. a cylinder, rectangle or parallepiped block, whose covering walls comprises melted and resolidified thermoplastic material containing the fibres, whilst the core comprises unmelted felt-like, but compressed mixture of fibres and binders containing polymer, powder or granules. The end faces are open, i.e. here the glass fibre - binder felt is visible, but not melted. Such semifinished products can e.g. be obtained by brief-high heating of only the surface area of a compressed material portion.

The semifinished product 82 is initially supplied to the hot gas station 83 shown in FIG. 2, which has an elongated temperature control chamber 84, whose cross-section corresponds to that of the semifinished product 82. Temperature control chamber 84 is laterally provided with an inlet 86 and in the represented embodiment has an outlet 87 displaced with respect thereto. The inlet and outlet could also be aligned. In this case, after filling a semifinished product they would have to be sealed gas type with slide valves.

In the represented embodiment there are also two pistons 88 in the temperature control chamber and in each case have openings 89 for the passage of hot gas. Here again the aforementioned hot inert gases can be used, or optionally hot air and if appropriate the gases are moved in closed circuit form.

Initially a semifinished product is introduced through inlet 86 into the channel with the right-hand piston retracted to the right and subsequently the right-hand piston is moved to the left into the temperature control zone. Then through the openings in a piston hot gas or air is introduced into the semifinished produced 82-containing chamber and is blown through the same and can escape through the opening in the other piston. The felt-like core of the semifinished product 82 is heated to a temperature which is just below the melting point, e.g. to 150° C. Subsequently the semifinished product is brought over outlet 87 by retracting the left-hand piston and advancing the right-hand piston and can be transferred through the same to inlet 91 of the compressing and dosing station, as shown in FIG. 3. The heated semifinished product - cylinder is again designated 82.

The dosing and compressing station of FIG. 3 is the same or very similar to the construction of FIG. 1, except for the different inlet area 91, which is constructed as a channel for supplying the semifinished product 82 and has no pouring inlet for the pourable initial product and no compressing piston. As a result of the temperature control or preheating of the felt-like core of the semifinished product 82 described relative to FIG. 2, the hot air station 55 of FIG. 1 between cooling station 81 and melting channel 64 provided with heating element 66 is no longer necessary. However, due to the preheating, a relatively short melting channel 64 can be used.

Upstream of the melting channel 64 is provided a temperature control area 81, which reliably keeps the semifinished product 82 introduced into this area at a temperature just below the melting point, so that here again sticking of piston 63 is avoided.

The semifinished product cylinders are supplied through supply duct 91 from temperature control station 83 and passed from the side into the precompressing area 61. Through piston 63, a semifinished product cylinder 62 is moved away from the opening of supply duct 91. Through retracting the piston the next cylinder can drop in front of the retracted piston 63, which is then further advanced. The cylinders are then pressed into the compressing channel 62 in melting channel 54, where they are heated to a temperature above the melting point of the thermoplastic material and lose their individuality to give a liquid or pasty continuous strand of glass fibres and liquid binder with a polymer component. For this main compression, simultaneously a vacuum can be applied to the compressing channel 62, to reliably prevent air inclusions.

The further processing takes place in the manner described relative to FIG. 2 until the material is supplied by the dosing station e.g. to a press for moulding a moulding.

We claim:

1. Apparatus for producing batches of a mouldable fibre-reinforced thermoplastic material matched to the mouldings to be produced, the apparatus comprising a melting device with a melting channel for softening the fibre-reinforced thermoplastic material to an at least one viscous condition, piston means aligned with the melting channel for pressing the fibre-reinforced thermoplastic material through the melting channel as a continuous strand, a supply duct for enabling supplying of a working area of the piston means with the fibre-reinforced thermoplastic material, said supply duct being arranged at a finite angle with respect to the melting channel and at a position upstream thereof, as viewed in a direction of flow of the fibre-reinforced thermoplastic material, and a dosing station disposed down stream of the piston means for dividing the viscous endless strand into a charge adjusted to the moulding to be produced.

2. Apparatus according to claim 1, wherein piston means is movably arranged in a compressing station disposed upstream of the melting device,.

3. Apparatus according to claim 2, wherein the compressing station includes a compressing channel connected to the melting channel of the melting device, and wherein the piston means is disposed at an end of the compressing channel remote from a transition point between the compressing and the melting channel.

4. Apparatus according to one of claims 2 or 3, wherein the compressing station includes a receiving and precompressing chamber communicating with said supply duct, a precompressing piston is movably mounted in said precompressing chamber in such a way that it presses the fibre-reinforced thermoplastic material supplied by the duct into an area of the precompressing chamber overlapping with the compressing channel and defining the working area of the piston means.

5. Apparatus according to one of claims 1, 2 or 3, wherein the melting channel is surrounded by a heating element over its entire length.

6. Apparatus according to claim 3, wherein cooling elements are provided in the compressing station for avoiding a sticking of melt to the piston means.

7. Apparatus according to claim 6, wherein the dosing station includes a dosing piston adjustable in a filling position.

8. Apparatus according to claim 7, wherein separating means are provided between the melting device and the dosing station.

9. Apparatus according to claim 8, wherein the dosing station includes a dosing channel accommodating the dosing piston and connected to the melting channel, and wherein an end of the dosing channel remote from the dosing piston is movable in a direction away from the melting device.

10. Apparatus according to claim 9, wherein vacuum lines communicate with the compressing channel to enable an application of a vacuum prior to a compression of the fibre-reinforced thermoplastic material thereby avoiding air inclusion.

11. Apparatus according to claim 10, wherein a hot gas station is connected upstream of the melting channel.

12. Apparatus according to claim 11, wherein the compressing channel surrounded by a metal filter through which hot gas can be radially blown through the compressing channel and the fibre-reinforced thermoplastic material 13. Apparatus according to claim 11, wherein upstream of the hot gas station is provided a supply opening for the melting and dosing station.

14. Apparatus according to claim 13, wherein the temperature control area includes a hot chamber for receiving a semifinished product, and slide pistons with openings through which a hot gas can be axially blown into the hot chamber.

15. Apparatus according to one of claims 2 or 3, wherein cooling elements are provided in the compressing station for avoiding a sticking of melt.

16. Apparatus according to one of claims 2 or 3, wherein the dosing station has a dosing piston adjustable in a filling position.

17. Apparatus according to one of claims 2 or 3, wherein separating devices are provided between the melting device and the dosing station.

18. Apparatus according to claim 17, wherein the dosing station includes a dosing channel accommodating a dosing piston and connected to the melting channel, and wherein an end of the dosing channel remote from the dosing piston is movable in a direction away from the melting device.

19. Apparatus according to one of claims 2 or 3, wherein vacuum lines communicate with the compressing station.

20. Apparatus according one of claims 2 or 3, wherein a hot air station is connected upstream of the melting channel.

21. Apparatus according to claim 20, wherein at least a portion of the compressing station is surrounded by a metal filter through which hot gas can be radially blown through the compressing station and the fibre-reinforced thermoplastic material therein.

22. Apparatus according to claim 20, wherein a temperature control area is disposed upstream of the melting channel for maintaining the fibre-reinforced thermoplastic material at a predetermined temperature.

23. Apparatus according to claim 22, wherein the temperature control includes a hot chamber for receiving a semifinished product, and slide pistons with openings through which a hot gas can be axially blown into the hot chamber.

* * * * *